Jan. 6, 1942.        P. H. JOHNSTON         2,269,312
            OPTICIAN'S MEASURING INSTRUMENT
              Filed July 11, 1940        5 Sheets-Sheet 1
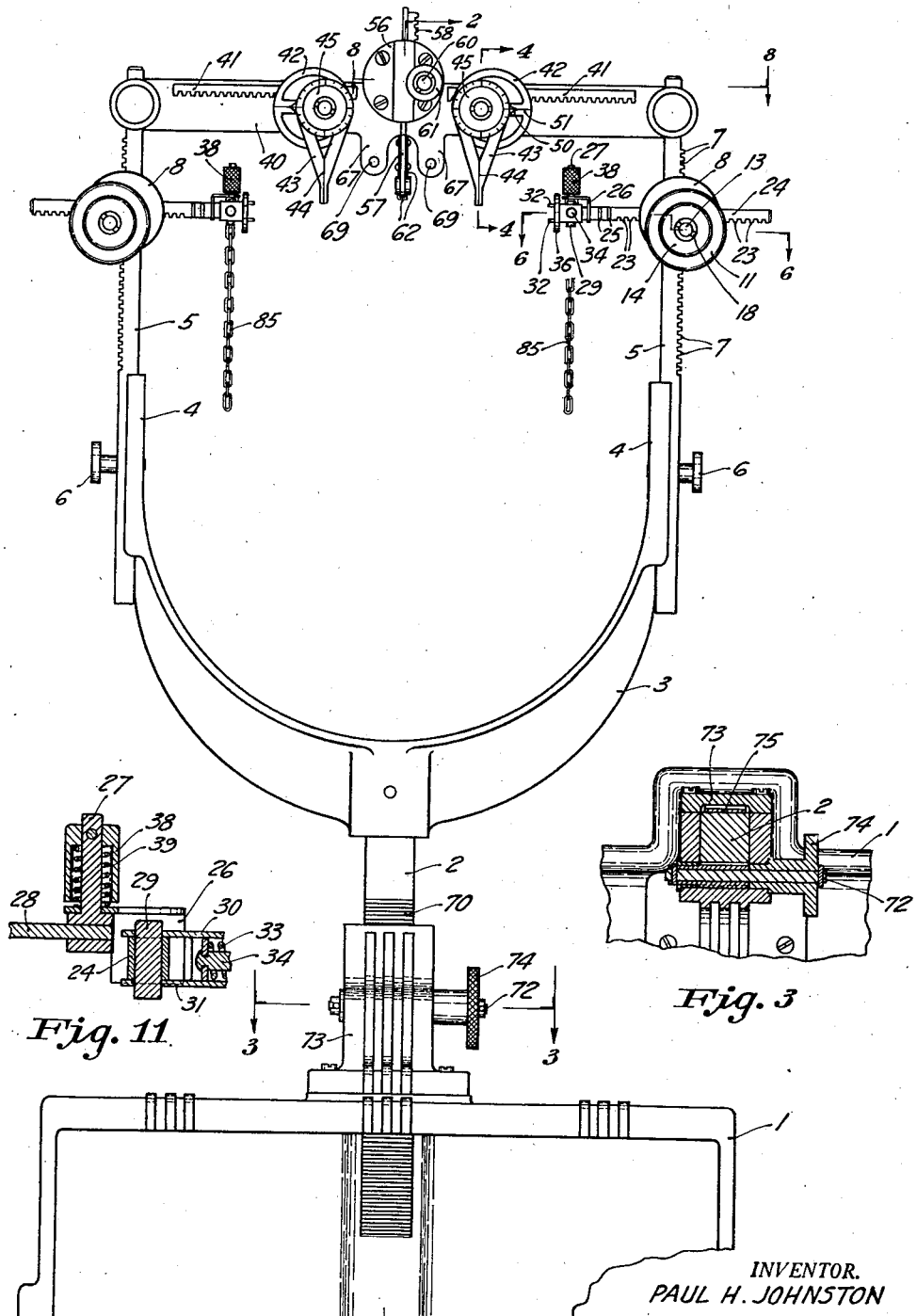
INVENTOR.
PAUL H. JOHNSTON
BY Merrill M. Blackburn
ATTORNEY

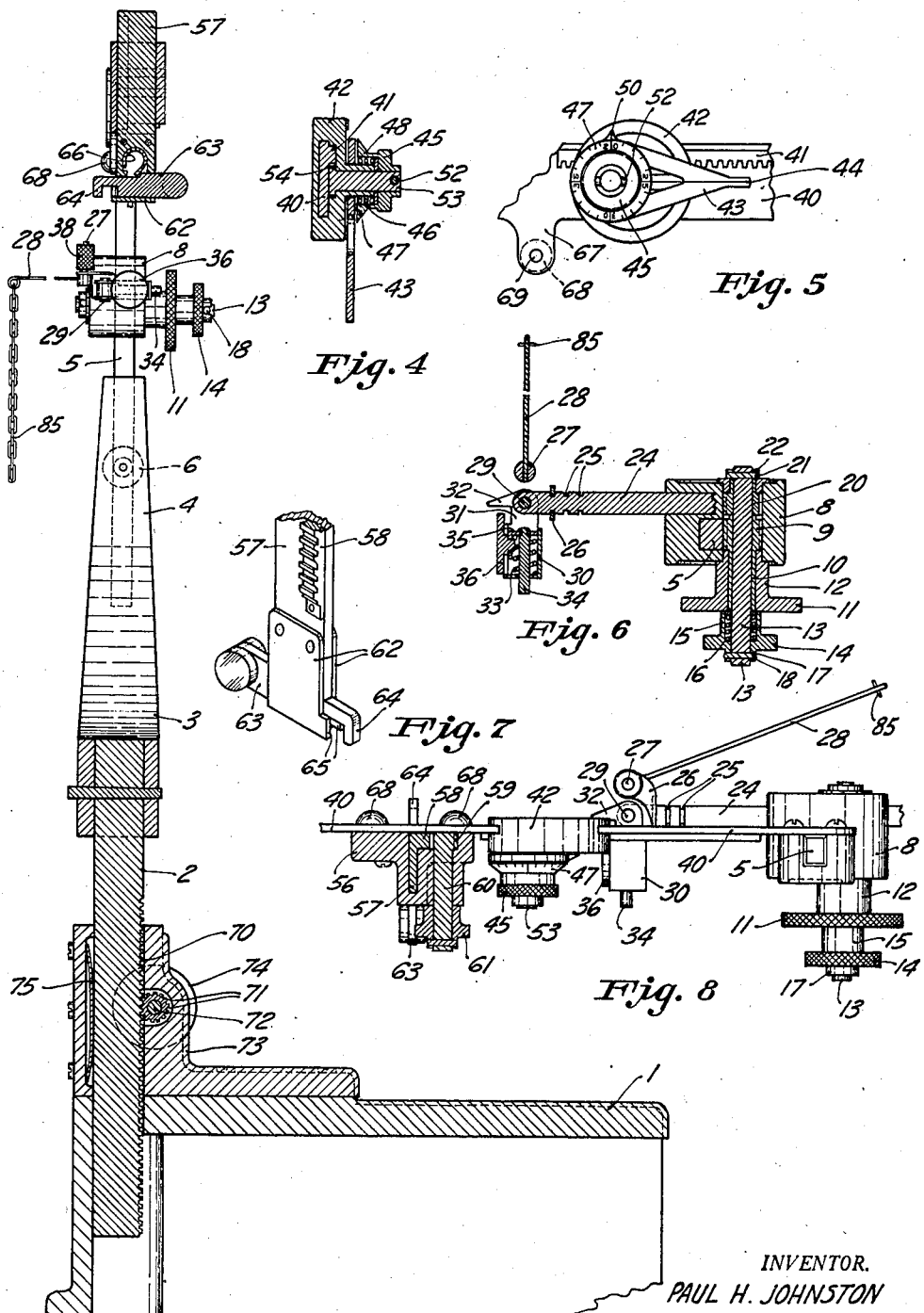

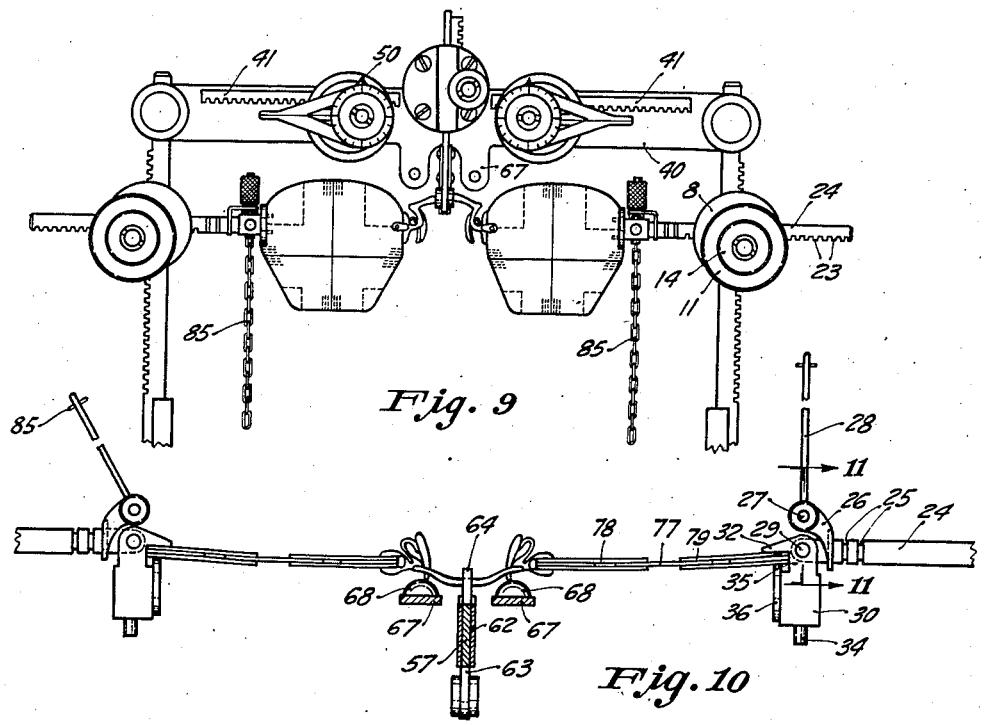
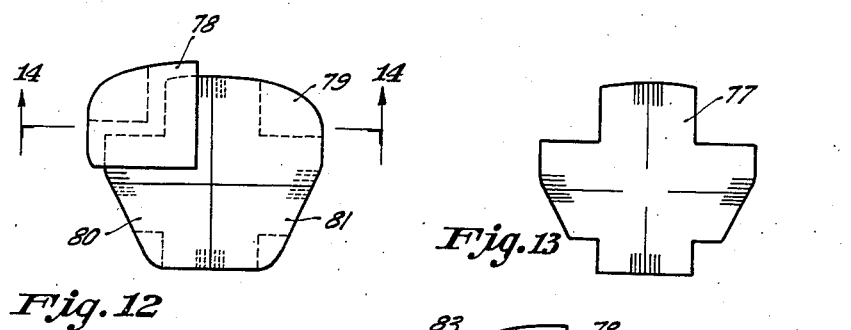
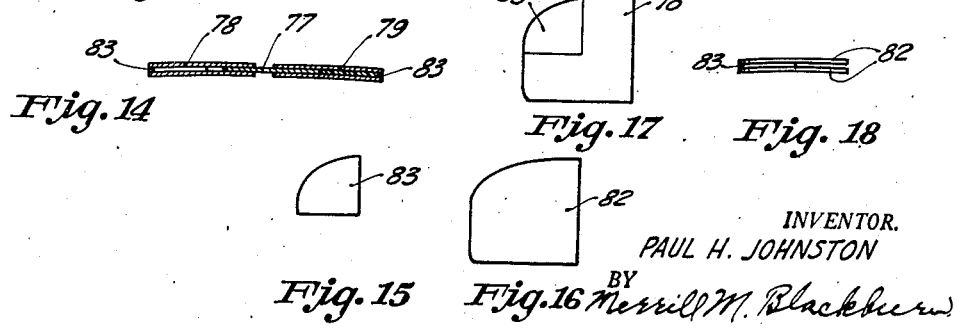

Jan. 6, 1942.                P. H. JOHNSTON                2,269,312
                      OPTICIAN'S MEASURING INSTRUMENT
                           Filed July 11, 1940              5 Sheets-Sheet 4
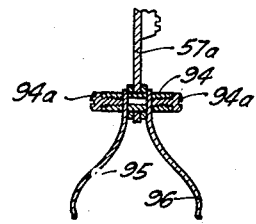
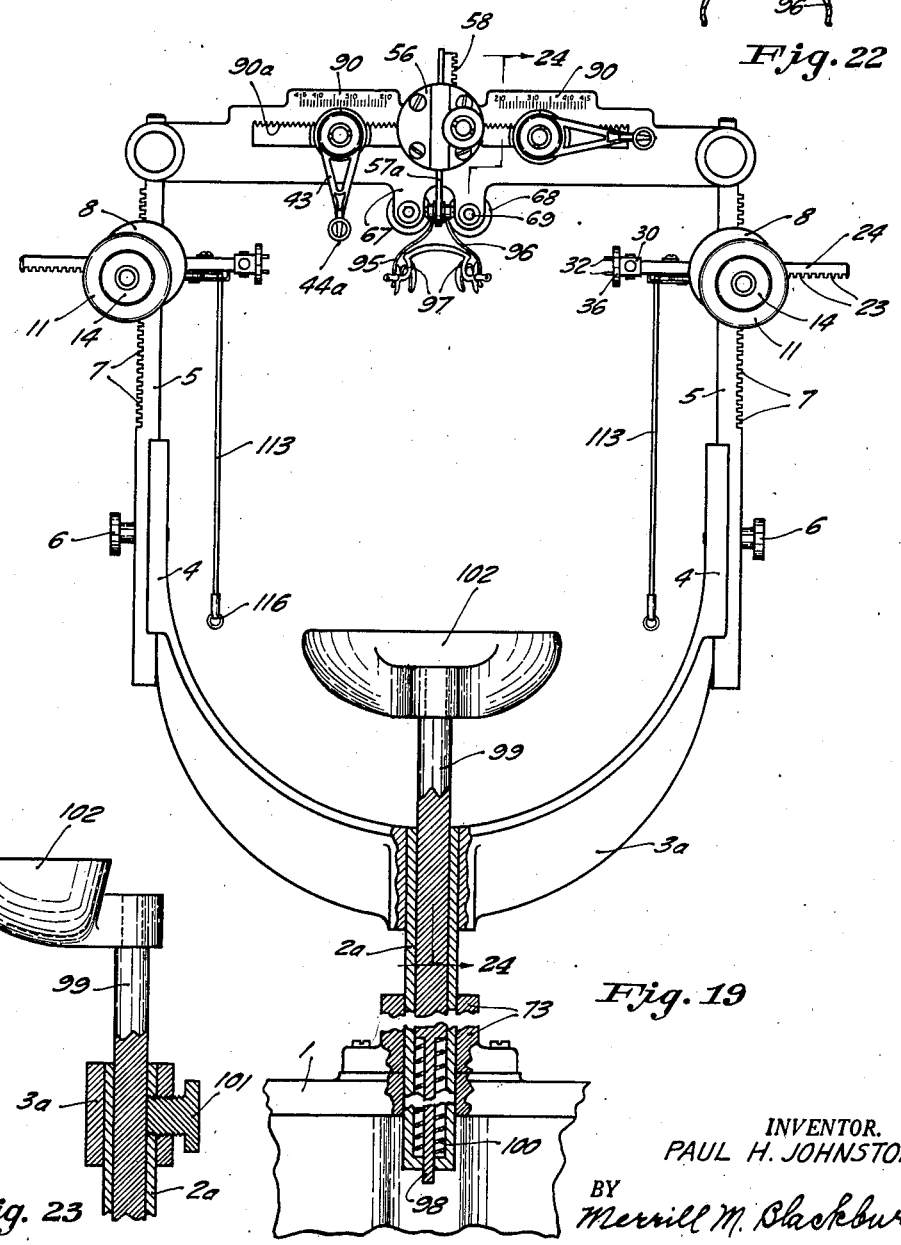
INVENTOR.
PAUL H. JOHNSTON
BY
Merrill M. Blackburn
ATTORNEY

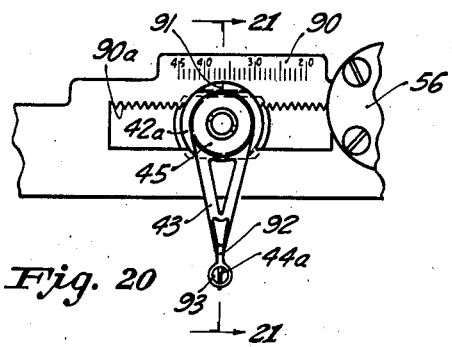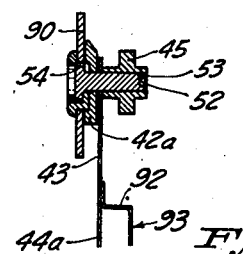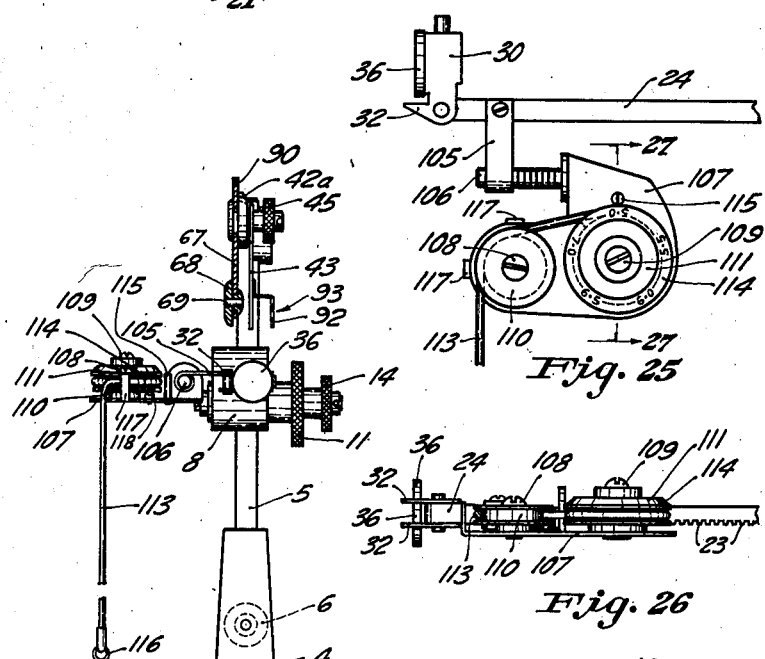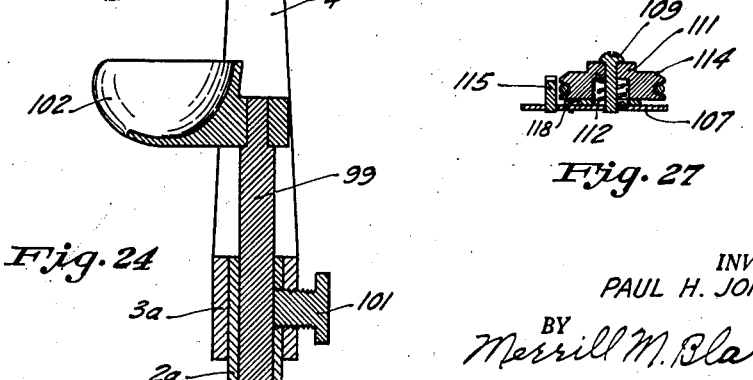

Patented Jan. 6, 1942

2,269,312

UNITED STATES PATENT OFFICE 2,269,312

OPTICIAN'S MEASURING INSTRUMENT

Paul H. Johnston, Davenport, Iowa

Application July 11, 1940, Serial No. 344,919

18 Claims. (Cl. 33—200)

There have been heretofore many instrumentalities invented for the use of opticians, oculists, and optometrists in the measurement of patients' faces when fitting glasses and spectacles. It is to this general class of instruments that the present invention pertains.

Among the objects of this invention are to provide a generally improved structure for the purpose indicated; to provide an instrumentality for the purpose indicated which is provided with convenient elements for the making of the various necessary measurements; to provide a mechanism of the character indicated in which means are provided for supporting a bridge and a pair of lenses in the positions which they will occupy when the glasses are fully assembled ready for use; to provide an instrumentality of the nature indicated in which the various parts are easily adjustable for the purpose of properly locating and supporting parts during the use of the mechanism; to provide a structure of the character indicated in which ease of adjustment and accuracy of measurement are attained in a high degree; to provide an instrumentality for accurately taking all facial and head measurements necessary in an adequate prescription or set of specifications for a pair of glasses, and, coincidentally, to provide means for assembling on the patient's face a representation of such glasses, with the component parts, lenses, bridge, temples, etc., properly selected as to style, size, and shape, and adjusted to set in desirable relationship to each other, so that a preview of the finished glasses to be made from such specifications can be had by the dispenser and prospective wearer; and such further objects, advantages, and capabilities as will hereinafter appear and as are inherent in the construction disclosed herein. My invention further resides in the combination, construction, and arrangement of parts illustrated in the accompanying drawings; and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents a front elevation of a structure embodying my present invention;

Fig. 2 represents a vertical, substantially central section, approximately along the plane indicated by the line 2—2 of Fig. 1;

Fig. 3 represents a horizontal section substantially along the plane indicated by the line 3—3 of Fig. 1;

Fig. 4 represents a vertical, transverse section substantially along the plane indicated by the line 4—4 of Fig. 1;

Fig. 5 is a fragmentary view of a portion of the structure shown in Fig. 1, the parts being shown in different relative positions with respect to each other;

Fig. 6 represents a transverse section substantially along the broken plane indicated by the line 6—6 of Fig. 1;

Fig. 7 represents an enlarged fragmentary perspective of a part of the mechanism shown in the upper central portion of Fig. 1;

Fig. 8 represents a fragmentary horizontal section substantially along the plane indicated by the line 8—8 of Fig. 1;

Fig. 9 represents the upper portion of the structure illustrated in Fig. 1 with certain parts adjusted to different positions and with certain elements supported by the instrumentality;

Fig. 10 represents fragmentarily a horizontal section through the upper part of the structure shown in Fig. 9;

Fig. 11 represents a vertical transverse section substantially along the plane indicated by the line 11—11 of Fig. 10;

Fig. 12 shows an expansible representation of a lens, the same being formed from a solidifiable plastic and being intended to be adjusted to different sizes to simulate lenses of different sizes and shapes;

Fig. 13 is a representation of the central element of Fig. 12 upon which a plurality of segments are adjustably mounted;

Fig. 14 represents a horizontal, transverse section, substantially along the plane indicated by the line 14—14 of Fig. 12;

Figs. 15, 16, and 17 show elements of construction;

Fig. 18 shows an edge view of the structure shown in Fig. 17;

Fig. 19 represents a fragmentary elevation, partly in section, of the embodiment of this invention which is now considered the preferred one;

Fig. 20 represents a fragmentary elevation on an enlarged scale of a part of the structure shown in Fig. 19;

Fig. 21 represents a transverse section of Fig. 20 substantially along the plane indicated by the line 21—21 of Fig. 20;

Fig. 22 is a fragmentary longitudinal section of a portion of the structure shown in Fig. 19;

Fig. 23 is a fragmentary elevation, partly in section, of a part of the structure shown in Fig. 19;

Fig. 24 represents a vertical transverse section substantially along the broken plane indicated by the line 24—24 of Fig. 19;

Fig. 25 represents a plane view of a reel, indicated broadly in Fig. 24; and

Figs. 26 and 27 represent, respectively, an edge view and a section along the line 27—27 of Fig. 25.

Reference will now be made in greater detail to the annexed drawings for a more complete description of this invention. This implement comprises a support and supported elements, the support comprising a base 1, a vertically adjustable standard 2, and a yoke 3 secured to the standard 2. The end portions 4 of the yoke extend substantially vertically and are provided on substantially parallel faces with guiding means for vertically adjustable racks 5 which are secured to the end portions or arms 4 by means of headed, shouldered, and threaded bolts 6. Either the arms 4 or the racks 5 can be provided with a plurality of holes for the reception of the bolts 6, thus providing for the vertical adjustment of the racks 5. The racks or rack bars 5 are provided with teeth 7 and each extends through an opening in a supporting body 8 in which is mounted a gear 9, said gear having its teeth meshing with the teeth 7 of the rack bar. The gear 9 is provided with a sleeve 10 which extends outwardly for the reception of an actuating member 11. A sleeve 12 constitutes a part of the member 11, the parts 10 and 11 being secured together in any suitable manner which makes it possible to rotate the gear 9 by turning the member 11. It will be understood that rotation of the gear 9 will cause the supporting body 8 to move up or down upon the rack bar 5.

A shaft 13 extends through the gear 9 and sleeve 10 and beyond the same at both its ends. Surrounding this shaft 13, at one end, is an actuating member 14 for the shaft. The member 14 has upon one face a cylindrical flange 15 which is spaced from the shaft 13 to form a receptacle for a spring 16. It will thus be seen that the member 14 is somewhat cup-shaped and that it receives the spring 16 within the hollow of the cup. A flange 17 projects from the opposite face of the member 14 and is notched for the reception of a pin 18 which passes through an opening in the end of shaft 13. This furnishes a positive driving connection between member 14 and the shaft so that rotary motion of the member 14 will cause rotation of the shaft 13.

Adjacent its opposite end, the shaft 13 has a gear 20 mounted thereon and secured thereto in driving relation so that rotation of the member 14 will cause rotation of the gear 20. This can be accomplished by passing a pin 21 through the end of the shaft 13 and through notches in the outer end of the sleeve 22 forming a part of the gear 20. The teeth of the gear 20 mesh with the teeth 23 of the rack bar 24. From the foregoing, it will be apparent that rotation of the member 14 about the axis of the shaft 13 will cause horizontal reciprocation of the rack bar 24, together with the elements of construction mounted thereon. The spring 16 has two functions, one being to prevent the pin 18 from dropping out of the opening in the shaft 13 and the other being to hold the rack bar 24 against undesired lateral movement. Suitable means may be provided for preventing undesired vertical motion of the supporting member 8 with respect to the rack bar 5.

The rack bar 24 is provided near its inner end with grooves 25 in which a bracket 26 may be selectively placed, said bracket being notched for this purpose. At its free end, the bracket 26 carries a post 27 from which projects an arm 28. At its free end, this arm has a fine chain attached thereto, the arm and chain being intended for the purpose of determining the length of temple to be used when making up a pair of spectacles and have them properly fit a particular face.

At its inner end, the rack bar 24 supports a pivot member 29 upon which is pivotally mounted a lens-holding structure 30. This structure has a pair of arms 31 which engage the pivot member 29, about which the member 30 may rotate in a horizontal direction. The arms 31 have fingers 32 which normally project in substantially the same longitudinal direction as the rack bar 24. The body of the member 30 is of box-like construction and has a spring 33 therein which surrounds a pin 34 and, at one end, presses against an end of member 30 and, at its other end, against a plate 35 to which the pin 34 is attached. A plate 36 is slidably carried by the body part of the member 30 and has a post projecting laterally from one face thereof into the box and through a flange of the plate 35 to which it is secured. From this it is apparent that the spring 33 may be compressed to draw the edge of plate 36 away from the fingers 32 whereby to provide a space between these parts for the reception of the edge of a lens, as shown in Fig. 10, the structure being somewhat comparable to that shown at the lower end of Fig. 7. Although this construction has been described in the singular, it will be understood from Figs. 1 and 9 that there are similar structures upon both sides of the machine.

Surrounding and pinned to the pivot member 27 is a sleeve 38 which has a cavity therein in which is located a spring 39. The lower end of this spring presses against the top of the upper arm of bracket 26 and tends to hold the parts in adjusted position when the externally milled sleeve 38 is manually turned to swing the arm 28 laterally, as shown in Fig. 8.

The upper end portions of the supporting members 5 are connected by a crossbar 40 which, as shown in Figs. 1, 5, and 9, has racks secured to one face thereof near its upper edge. These racks 41 assist in the lateral movement of the supporting members 42 which carry the pointers 43, used in the measurement of the pupillary distance of a patient. As shown most clearly in Fig. 1, each of these pointer members has an indicating line 44, these lines being capable of being lined up with the pupils of the patient by taking hold of the members 45 and turning them to bring the lines 44 into alignment with the pupils. A ring 46 has a beveled face 47 and has a sufficient internal diameter to accommodate a spring 48 which serves to hold the indicators or pointers 43, either in the position shown in Fig. 1 or in that shown in Figs. 5 and 9. A pointed projection 50 on the ring 46 cooperates with an index line 51 to show when the line 44 is vertical.

As shown in Fig. 4, a pin 52 connects the member 45 with the pivot member 53 which has a pinion on its inner end. This pinion 54 meshes with the rack 41 and effectuates longitudinal movement of the supporting member 42 along the bar 40. The pin 52 keeps the member 45 from being pushed off from member 53 by the spring 48. The graduations on the beveled face 47 give a direct reading in millimeters, the reading being the distance of the line 44 from the mid-point in the width of the frame. If the two readings are added together, the sum will be the pupillary distance of the patient being measured. If the face is symmetrical, the two distances should be equal but, quite often, this is not true. At any rate, with the two readings entered on the record card, the operator making up the spectacles will known just what distance to provide on each side of the center line.

The spring 48 tends to hold the indicator member 43 in any position of adjustment about the sleeve projecting from the face of member 42, as shown in Fig. 4. From this figure it will be seen that the member 42 may be manually rotated about this sleeve and that it will be held in adjusted position by the pressure of the spring 48 against its face. It is also desired to point out that the sleeve 46 is connected with the member 45 so that rotation of the latter will cause rotation of the former, thus keeping the scale on face 47 at a proper point to directly read the distance from the line 44 to the mid-point in the width of the frame when the indicators 43 occupy the positions shown in Fig. 1.

A supporting member 56 is mounted upon and secured to the crossbar 40, as shown in Figs. 1 and 8. A bar 57 is slidable vertically through the support 56 and carries a rack 58 by means of which it may be moved vertically by a cooperating pinion 59 on the shaft 60. The shaft 60 is suitably secured to the operating member 61. It is evident from this that rotation of the member 61 will cause rotation of the gear or pinion 59, resulting in vertical adjustment of the bar 57 and the parts carried thereby. A suitable member 62 is secured to the lower end of the bar 57, providing a space between the member 62 and the end of bar 57 for the reception of the holding means 63. The holding member 63 has a hook 64 at its end adjacent the patient's face, while the member 62 is provided with suitable means 65 against which the hook 64 may hold a spectacle bridge. As shown in Fig. 2, a suitable means, such as a spring 66, is provided for retracting the member 63 and pulling the hook 64 toward the means 65 whereby to grip the bridge and support it against the nose of the patient, as set forth more fully hereinafter.

Arms 67 project downwardly from the crossbar 40 and serve as supporting means for pads 68 so positioned as to bear against the forehead of the patient when his face is properly positioned with respect to the measuring mechanism. Securing means 69 serve to hold the pads 68 to the arms 67. In order to enable the operator to adjust the height of the instrument so that the pads 68 and the spectacle bridge will be properly positioned with relation to the face of the patient, the standard 2 is provided on one face with a rack 70 with which meshes a pinion 71 carried fixedly by a shaft 72 mounted in the support 73 which is secured to the base 1. A hand-wheel 74 is secured to the shaft 72 and furnishes means whereby vertical adjustment of the standard 2 may be made. As shown in Fig. 2, there is space within the support 73 and between it and standard 2 for the reception of the flat spring 75 which furnishes sufficient pressure to hold the support 2 in adjusted position.

Another part of my invention is shown in detail on Sheet 3 of the drawings. This comprises an adjustable representation of a lens. This comprises a curved body member 77 and four adjustable segments 78, 79, 80, and 81. Each of the segments is made up of a pair of elements 82 of substantially identical shape and secured to opposite faces of a similar small piece 83. This results, as shown in Figs. 14 and 18, in the production of a transparent piece, the major part of which is open for the reception of two arms of the body member 77, the same being slid in edgewise between the parts 82. It is clear that the upper segments 78 and 79 may be separated from the lower segments 80 and 81, or the segments may be separated laterally, or they may be separated both vertically and laterally. In this way, it is possible to adjust the size of the representation of the lens but it will of course be understood that there will be notches in the edges when the segments are separated. However, this does not seriously interfere with the representation of the lens, and one can get quite a fair idea as to what the spectacles will look like when the bridge and the representations of the lenses are mounted in the instrument, as shown in Fig. 9.

The body member 77, as shown in Fig. 13, has gauge lines provided along its edges for use in determining the size of lenses to be used. If the dimensions of the lens imitation are known, then the deviation in size from the known dimensions can be determined by adding to the length and breadth of the lens the number of millimeters shown by the gauge lines on the body member 77 between the edges of the segments. For example, suppose the length of the lens to be thirty-eight millimeters when the segments are all closed up, as shown in Fig. 9, and suppose the height of the lens to be thirty-four millimeters. Now, suppose that this lens is not large enough to fit the face of the patient and that a longer and broader lens is required. The right and left hand segments can now be adjusted laterally to give the desired length. Then the upper and lower segments can be adjusted vertically, relatively to the body member 77 until the desired height is determined. Suppose it is found that the proper length of lens is forty-four millimeters and that the proper height is forty millimeters. This is determined by observing the gauge lines at the edges of the body member, counting up the number of spaces between the segments, and adding these amounts to the basic length and height of the body member.

On Sheets 4 and 5 of the drawings there are shown improvements which are not present in the structure of Sheets 1, 2, and 3. In the first place, the surface 47 and its graduations are omitted, and a graduated bar 90 serves the purpose of indicating the pupillary distance, this bar being graduated, preferably, in millimeters, to give a direct reading of the distance from the mid-index point to the line 44, represented in this form by a pointer 44a. An indicator 91 carried by the support 42a, corresponding to the support 42 previously referred to, is a reference point for the reading of the scale on the bar 90. It will be obvious that rotation of the knob 45 will cause the gear 54, engaging the rack teeth 90a on the edge of bar 90, to cause movement of the support 42a with relation to the bar 90, which takes the place of bar 40. In order to insure that the operator, when taking a measurement, is looking from the proper position, a bracket 92 is secured to the arm 43 and is provided with an opening 93 of such a form that, when the center of the opening is brought into alignment with the index 44a, the line of vision will be perpendicular to the plane of the instrument. It will be apparent that, when the patient's face is properly arranged with respect to the instrument, and the pointer 43, 44a is turned into vertical position, and the opening 93 and index 44a are correctly lined up in front of the pupil, then the support 42a is correctly positioned. As may be seen from Fig. 20, the pointer 91 is in close proximity to the scale on bar 90, and a direct reading may be made thereon of the distance of the pointer 44 from the mid-plane of the patient's nose. As shown in Fig. 19, the distance on the two sides of the patient's face may differ somewhat.

The bar 57a differs somewhat from the bar 57, as appears more clearly from a comparison of Figs. 2, 7, and 22. As shown in the last named figure, an internally threaded sleeve 94 is pushed through an opening in the lower end of the bar 57a, in which opening it fits tightly enough to be held in adjusted position. This sleeve has openings in its opposite end portions, and the arms 95 and 96 are shoved into these openings and are held therein by set-screws 94a. As shown most clearly in Fig. 19, these spring arms 95 and 96 are inserted between the ears of the lens mount 97. This mount 97 comprises the usual parts, bridge, nose pads, straps, ears, etc. It is therefore apparent from the foregoing that the lens mount will be properly positioned with relation to the nose and eyes of the patient. To accomplish proper adjustment of the bridge, the arms 95 and 96 may be swung toward or away from the nose because they are carried by the sleeve 94 which is rotatable in the support 57a.

The support 1 of Fig. 19 is substantially the same as the corresponding structure described above. The elements 2a and 3a differ somewhat from the corresponding elements 2 and 3. From Fig. 19 it will be seen that the support 2a is hollow instead of solid, as in Fig. 1, and the support 3a has an opening entirely therethrough for the reception of the tubular member 2a. Centrally located in the lower end of the member 2a is an opening for the reception of the extension 98 of the post 99. This extension 98 is small enough to provide space between it and tubular member 2a for the reception of the spring 100.

The post 99 is adjustable vertically by loosening the set-screw 101, and carries at its upper end a chin-rest 102. Loosening of the screw 101 enables the spring 100 to raise the rest 102 into contact with the chin of the patient.

Brackets 105, in the preferred form, are secured to the rack bars 24, as shown in Fig. 25. These project in a general way toward the face of the patient but are to be located laterally and forwardly thereof. Each of these brackets carries a post 106 which supports a plate 107 in which are carried the pivot pins 108 and 109. On these pins are rotatably mounted the spools 110 and 111. The latter is hollow and forms a container for the spring 112 which rotates this spool in a direction to wind the flexible member 113 thereon in the general manner of an eyeglass chain reel. On the top, beveled margin 114 of the spool 111 are graduations indicating the length of temple needed to fit the face of the patient. These may be stated in inches or centimeters, but are commonly given in inches. On the upper end of the post 115 is an index line which cooperates with the marks on the edge of spool 111 to give a direct reading of the temple length. The post 115 also serves to prevent the flexible member 113 from leaving the groove of the spool 111. In measuring the length of the temple, the end 116 is pulled backwardly along the side of the patient's face until it reaches the position which it is desired that the end of the temple shall occupy, and then the length is read directly from the scale on the surface 114. Arms 117 serve to hold the flexible member 113 in place on the spool 110. Cooperating members 118 on the plate 107 and spool 111 serve as stop means to limit the take-up of member 113 by spool 111, due to the action of spring 112.

With the lens imitation adjusted to the size indicated, the plate 36 can be adjusted with relation to the fingers 32, manually, until there is sufficient opening between the plate and fingers to insert a lens imitation, as illustrated in Fig. 10. Such adjustment compresses the spring 33 and, when the plate is released, the spring forces it into engagement with the lens imitation, and forces this against the fingers 32, whereby the imitation is held in fixed position with relation to this clamp. If it is desired to swing the lens imitation away from an eye of the patient, it is only necessary to take hold of the sleeve 38 and rotate it in the proper direction to swing it away from the patient's face. If desired, the edge of the lens imitation can be inserted between the ears at the ends of the bridge, or the edge of the lens imitation can be arranged either to the front or rear of the ears. It is considered that a better effect is produced by having the lens imitation either between the ears or between the ears and the patient's face. Lateral adjustment of lenses can be secured by turning the knob 14 which rotates the pinion 20 and, consequently, moves the rack bar 24 either in or out. It is to be understood that actual lenses may be supported in this manner just as well as imitations.

Let us assume that the proper size of lenses has been determined and the representations thereof have been mounted in the instrument, as shown in Figs. 9 and 10. Also, let us assume that, in this position, the temple indicating rod 28 is too close to or too far from the face. Now, the bracket 26 can be lifted and inserted in one or another of the notches 25. When the proper location of the temple has been determined, the length of the ears to be used at the outer ends of the lenses for the attachment of the temples can be determined. With the rods 28 located at the sides of the face, the flexible means 85 can be put over the ears and the required length of temple determined from inspection. It is preferable to use graduated extensions 85 so that there will be direct reading.

In this specification and the appended claims, the term "optician" is used in a generic sense to denote any one making measurements for the preparation of spectacles or eyeglasses, or one who actually prepares them.

It will of course be understood that the specific description of structure set forth herein may be departed from without departing from the spirit of this invention as set forth in the appended claims.

Having now described my invention, I claim:

1. An optician's measuring instrument comprising, in combination, a supporting base, a support for measuring instrumentalities supported thereby and vertically adjustable with relation thereto, said support having posts spaced farther apart, laterally, than the width of the human face, a crossbar connecting the upper portions of said posts and having bridge-gripping means arranged substantially centrally of the length thereof whereby a spectacle bridge may be correctly positioned and held on the nose of a patient, and lens-gripping means mounted on said posts for movement vertically and horizontally with relation thereto whereby means simulating lenses may be supported before the eyes of the patient.

2. In an optician's measuring instrument, vertical, laterally spaced, supporting posts, a crossbar connecting the upper portions of said posts, a spectacle bridge-supporting mechanism mounted substantially midway of the crossbar, said mechanism having adjacent its lower end bridge-gripping means, and mechanism for adjusting the bridge-supporting mechanism so that the bridge rests at the proper place on the nose.

3. In an optician's measuring instrument, a pair of supporting posts to be arranged at opposite sides of the face of a patient, a supporting bar connecting the upper end portions of said posts, centering means substantially midway of the length of said bar for centering the instrument with relation to the patient's face and furnishing a gauge indicator for use in making facial measurements, and measuring indicators pivotally mounted on said bar to be rotated into line before the patient's eyes or to be rotated out of such position.

4. A structure as defined by claim 3 in which the measuring indicators are horizontally movable toward and away from the centering means and are provided with means for causing such movement.

5. A structure as defined by claim 3 in which the measuring indicators are movable longitudinally of the supporting bar and are provided with means for indicating the lineal spacing of the indicators from the centering means.

6. An adjustable representation of a lens, formed from a transparent solidified plastic, said representation comprising a plurality of segments each having a plurality of similar parts, secured together in spaced relation to admit another part of said representation between them, said other part fitting closely the space between the segment parts whereby to furnish a frictional holding grasp to hold the segments and said other part in adjusted positions relatively to each other.

7. A structure as defined by claim 6 in which said other part is provided in its corner portions with notches for the reception of the spacing means holding the segment parts separated.

8. A structure as defined by claim 6 in which the edges at opposite ends of the vertical and transverse axes of said other part are provided with gauge lines whereby to determine the overall length and breadth of the lens representation.

9. An adjustable representation of a lens, formed from a transparent solidified plastic, said representation comprising a plurality of segments each having a plurality of similar parts, secured together in spaced relation to admit another part of said representation between them, said other part fitting closely the space between the segment parts whereby to furnish a frictional holding grasp to hold the segments and said other part in adjusted positions relatively to each other, said other part being provided in its corner portions with notches for the reception of the spacing means holding the segment parts separated, and the edges of said other part, at opposite ends of the vertical and transverse axes of said other part, being provided with gauge lines whereby the overall length and breadth of the lens representation may be determined.

10. An optician's measuring frame comprising supporting means, uprights supported thereby, a supporting cross-member connecting the upper portions of the uprights, said member having on one face thereof a rack, a supporting element on said cross-member movable longitudinally thereof and carrying a pinion which meshes with said rack, and means for rotating said pinion to adjust said supporting element along said cross-member, said pinion rotating means having thereon position indicating means for determining the position of said supporting element with relation to the length of said cross-member.

11. A structure as defined by claim 10 having supporting elements on said cross-member upon opposite sides of the mid-point in the length thereof, said supporting elements each having a gauge element pivotally mounted thereon to swing from a vertical position to a horizontal position and vice versa.

12. A structure as defined by claim 10 having supporting elements on said cross-member upon opposite sides of the mid-point in the length thereof, said supporting elements each having a gauge element pivotally mounted thereon to swing from a vertical position to a horizontal position and vice versa, and a vertically adjustable index member carried by the cross-member and serving as a zero point from which measurements are made to the respective gauge elements.

13. An optician's measuring frame comprising a support having a cross-member extending thereacross at its upper end, said cross-member being provided with positioning means to position the frame with relation to the face of the patient, said frame having substantially vertical side supports for the cross-member, and supporting units on said side supports movable substantially vertically thereon, said supporting units carrying horizontally movable racks provided at their inner ends with gripping means to engage and support lenses or the like before the eyes of the patient.

14. An expansible representation of a lens comprising a plurality of segments of a solid transparent medium connected together for adjustment with relation to each other, the structure having connecting means whereby part of the segments are connected together in pairs to receive between them an unconnected segment.

15. In an optician's measuring instrument comprising a supporting framework and measuring instrumentalities carried thereby; one of said instrumentalities comprising a supporting member positioned laterally and forwardly of the patient's face, a spring-actuated spool pivotally mounted thereon, a flexible member connected to said spool to be wound thereon by the action of the spring and to be unwound therefrom by pulling, said flexible member being adapted when unwound from said spool to be used in the measuring of the length of a temple required by a patient, and said spool having graduations thereon from which may be read directly the length of temple required.

16. In an optician's measuring instrument having a supporting framework including as an element thereof a supporting cross-bar connecting opposite sides of the instrument; a supporting instrumentality supported by said cross-bar for adjustment transversely thereof, said supporting instrumentality supporting at one end a pair of curved spring arms adapted to have their free ends received between the pairs of ears at opposite ends of a bridge and to support said bridge by engagement with the ends of the bridge or connected parts forming a part of the bridge assembly.

17. An instrument for measuring pupillary distance having as a part thereof a pointer, said pointer comprising a slender member to be positioned before the face of a patient, and a bracket connected to said member and having a portion spaced therefrom, said portion having a sighting opening therethrough opposite the end portion of said pointer to enable the user of the instrument to position the pointer before the face of the patient with the opening, the pointer, and the pupil of the patient's eye in alignment.

18. In an optician's measuring instrument, supporting means for positioning and supporting the face of a patient, means for taking the necessary facial measurements to enable the user to write a prescription for a pair of glasses, with the exception of the required optical measurements, and means for supporting before the face of the patient the elements which are to be assembled in the pair of glasses for substantial representation thereof.

PAUL H. JOHNSTON.